United States Patent [19]

Stork

[11] 3,948,113
[45] Apr. 6, 1976

[54] MULTI-RIBBED POWER TRANSMISSION BELT AND METHOD OF MAKING SAID BELT

[75] Inventor: Delyn M. Stork, Lincoln, Nebr.

[73] Assignee: The Goodyear Tire & Rubber Company, Akron, Ohio

[22] Filed: Nov. 29, 1974

[21] Appl. No.: 528,055

[52] U.S. Cl. .................................. 74/234; 74/237
[51] Int. Cl.² .................. F16G 5/00; F16G 1/22
[58] Field of Search .......................... 74/234, 237

[56] References Cited
UNITED STATES PATENTS

| 1,777,864 | 10/1930 | Short | 74/234 |
|---|---|---|---|
| 2,211,202 | 8/1940 | Freedlander | 74/233 |
| 2,442,037 | 5/1948 | Carter et al. | 74/233 |
| 2,728,239 | 12/1955 | Adams, Jr. | 74/234 X |
| 3,626,775 | 12/1971 | Gentry | 74/234 X |
| 3,643,518 | 2/1972 | Semin et al. | 74/234 X |
| 3,838,605 | 10/1974 | Muller | 74/234 |
| 3,853,017 | 12/1974 | White, Jr. et al. | 74/234 |

Primary Examiner—Leonard H. Gerin
Attorney, Agent, or Firm—F. W. Brunner; R. P. Yaist

[57] ABSTRACT

A belt of integral unitary construction for transmitting power at low tensions and the method of making the belt. The belt includes a continuous body having top and bottom surfaces which are equally spaced apart across the width and throughout the continuous length thereof. The body comprises a neutral axis section extending throughout the length of the belt with a tension section on one side thereof extending toward the top surface of the belt and a compression section on the other side thereof. The tension section extends transversely across the entire width of the belt and at least one groove is provided in the compression section extending from the bottom surface through the compression and neutral axis sections into a portion of the tension section to form a plurality of power transmitting ribs extending longitudinally of the belt to provide a tension section, compression section, and neutral axis in each individual rib. The invention is particularly useful with multi-grooved pulleys in a heavy-duty drive.

16 Claims, 15 Drawing Figures

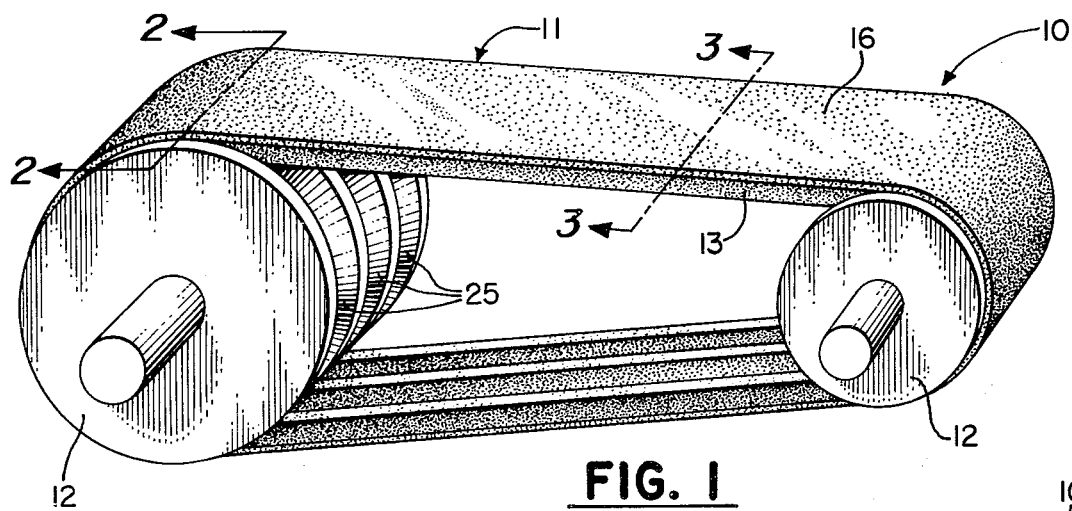
FIG. 1
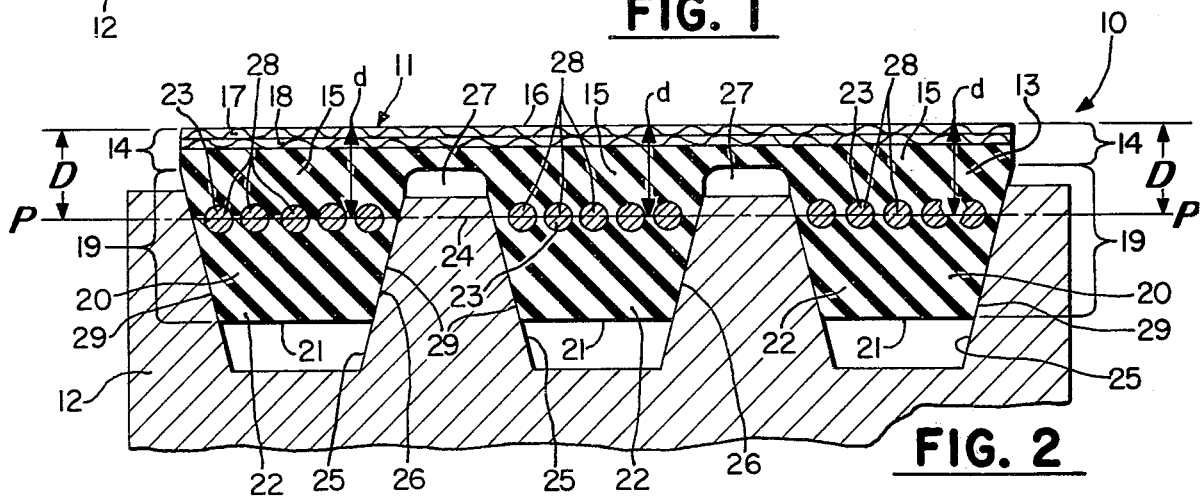
FIG. 2
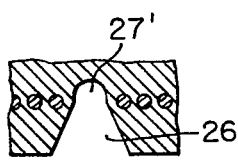
FIG. 2a
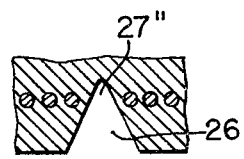
FIG. 2b
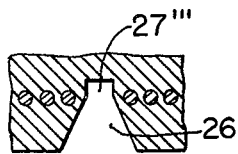
FIG. 2c
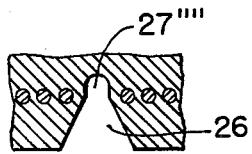
FIG. 2d
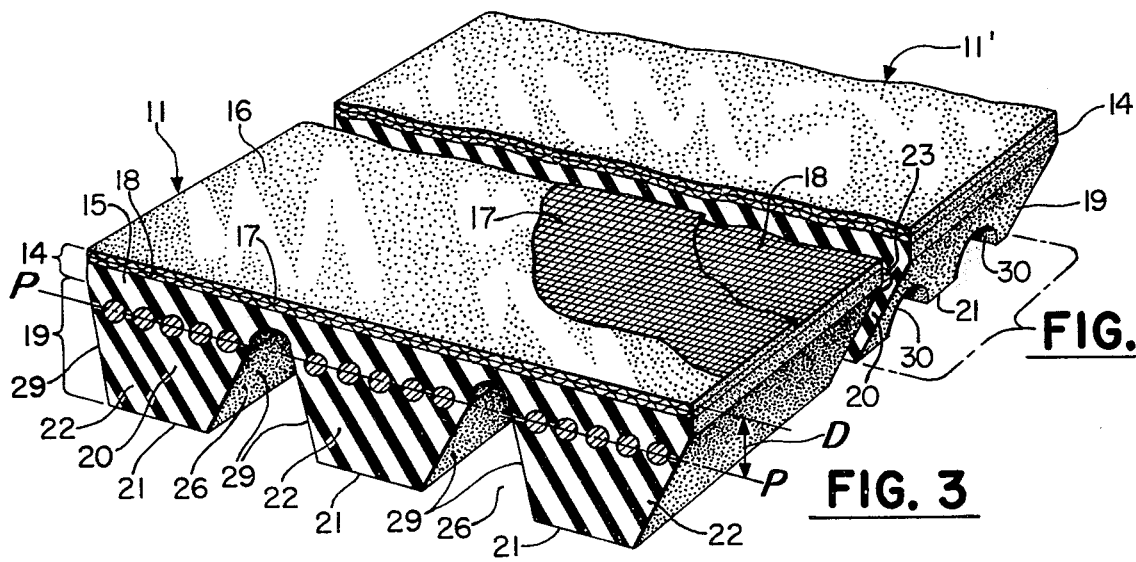
FIG. 3
FIG. 4

MULTI-RIBBED POWER TRANSMISSION BELT AND METHOD OF MAKING SAID BELT

BACKGROUND OF THE INVENTION

This invention relates to power transmission belts and more particularly to multi-ribbed power transmission belts for use with multi-grooved sheaves or pulleys in heavy duty type drives. The invention relates specifically to an improved belt of this type having a more unitary structure for the transmission of power at low tensions. The invention also relates to the method of making the improved belt.

Multiple ribbed or grooved power transmission belts in the prior art have essentially taken two basic forms. In one a plurality of individual V-belt sections of essentially trapezoidal cross-section have been bonded together by means of a flexible tie band of rubber and fabric. Each of the individual V-belts include a reinforcement usually in the form of stress-resisting cords composed of such materials as cotton, nylon, rayon, polyester, wire, glass, or any other suitable material well known in the art. Typical of this type belt are those disclosed in U.S. Pat. No. 2,263,960 to Wilson, U.S. Pat. No. 3,404,577 to Zahn, U.S. Pat. No. 3,523,461 to Nemecek et al., and U.S. Pat. No. 3,564,933 to Clinkenbeard.

In another form the multiple ribbed belts are essentially flat power transmission belts having a plurality of longitudinally extending substantially V-shaped or trapezoidal-shaped ribs molded or cut on the inner surface thereof. The ribs are intended to mate or register in correspondingly aligned V-shaped pulley grooves. In this type belt the reinforcing cords are disposed above the ribs. U.S. Pat. No. 2,728,239 to Adams Jr. and U.S. Pat. No 2,802,511 to Waugh are typical of this latter type multi-ribbed belt.

The prior art belts have not been entirely satisfactory for the purpose intended. For example, when individual molded V-belts have been tied together there has been a tendency to create variances in the cord line in each rib and from rib to rib, thus causing differential driving tendencies of the banded belts since the neutral axis or cord line in each belt is in a slightly different location with respect to the top or bottom surfaces of the belt. Also, in the type of multiple ribbed belt in which the cord line is disposed above the ribs, each individual rib is not capable of the traditional V-belt wedging action in the pulley grooves. This is the case since the cord tensile member is not located in each individual rib and no clearance spaces are provided between the multi-grooved pulley and the belt thereby not allowing individual wedging action to occur.

The beforementioned disadvantages of the prior art multi-ribbed or multi-grooved belts are overcome by the belt structure of the present invention which will be hereinafter fully described.

OBJECTS OF THE INVENTION

It is a primary object of the present invention to provide a belt of integral unitary construction which will transmit power at low tensions.

It is another important object of the present invention to provide a multi-ribbed power transmission belt for use with a multi-grooved pulley with the belt having a more unitary construction in which the neutral axis or cord line of the belt does not vary substantially in each rib and from rib to rib.

It is another object of the present invention to provide a belt of the type described which acts as a single unit but is capable of power transmission over two or more pulley grooves since each individual rib of the cross-section of the unit is capable of traditional V-belt wedging action.

It is still another object of the present invention to provide a method of making a belt of the type described.

Other objects and advantages of this invention will become apparent hereinafter as the description thereof proceeds, the novel features, arrangements, and combinations being clearly pointed out in the specification, as well as the claims thereunto appended.

It has been found in accordance with the teachings of the present invention that the before mentioned objects can be accomplished by providing a belt of integral unitary construction comprising a continuous body having top and bottom surfaces which are equally spaced apart across the width and throughout the continuous length thereof. The body comprises a neutral axis section extending throughout the length of the belt with a tension section on one side thereof extending toward the top surface of the belt and a compression section on the other side thereof with a continuous part of the tension section extending transversely across the entire width of the belt. At least one groove in the compression section extends from the bottom surface through the compression and neutral axis sections into a portion of the tension section to form a plurality of power transmitting ribs extending longitudinally of the belt to provide a tension section, compression section, and neutral axis in each individual rib.

The foregoing objects and advantages of the invention are also accomplished by a multi-ribbed transmission belt for use with multi-grooved pulleys with the belt having a longitudinally extending body of an integral unitary construction. The body comprises a first portion in cross-section being of generally rectangular configuration with one face thereof forming the top surface of the belt; a second portion adjacent to the first portion with one face thereof defining the bottom surface of the belt. The second portion includes: a plurality of power transmitting ribs with each rib having at least one stress-resisting member embedded therein with the member extending longitudinally of the belt and disposed across the width of the rib with the member in one rib being aligned with the member in an adjacent rib so that the distance between the top surface of the first portion and a horizontal plane through all of the members in all of the ribs is substantially equal. Each rib has a cross-sectional configuration adapted to conform to a groove of the pulley; and a groove provided between each adjacent rib penetrating from the bottom surface of the second portion through the horizontal plane of the stress-resisting members and terminating at substantially the inner face of the first and second portions to provide a clearance gap for passage of the belt over the pulley thereby allowing a complete wedging action of each rib in its corresponding pulley groove.

The objects and advantages of the invention are also accomplished by a method of making a power transmission belt comprising the steps of forming a belt body of substantially uniform cross-section with at least one stress-resisting layer embedded therein at a predetermined distance from one surface of the body and forming at least one groove in the opposite surface of the body extending longitudinally thereof and penetrating into the body to intersect a horizontal plane through the stress-resisting layer and terminating at a predetermined distance from the first mentioned surface to thereby separate portions of the stress-resisting layer and form a plurality of individual belt sections across the width of the body with each section including a portion of the stress-resisting layer.

DESCRIPTION OF THE DRAWINGS

In the drawings:

FIG. 1 is a perspective view of a belt drive assembly incuding multiple grooved pulleys and the multiple ribbed transmission belt of the present invention shown in its operating position around these pulleys;

FIG. 2 is an enlarged sectional view taken on the line 2—2 of FIG. 1;

FIGS. 2a–2d are enlarged schematic views showing modifications of the invention as shown in FIG. 2;

FIG. 3 is an enlarged fragmentary perspective view taken on the line 3—3 of FIG. 1;

FIG. 4 is a modification of the invention shown in FIG. 3;

DESCRIPTION OF THE PREFERRED EMBODIMENTS

Figure 5:
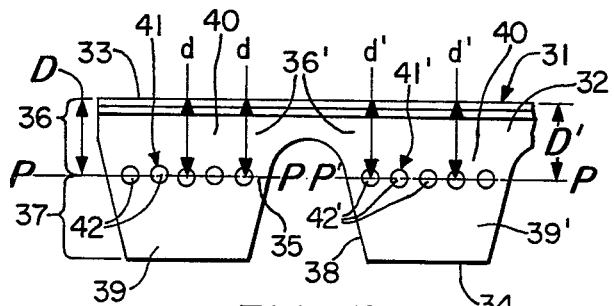
FIG. 5 is an enlarged schematic view of another form of the belt of the invention more clearly illustrating the novel structural features of the invention.

Referring now to the drawings, in FIGS. 1 and 2, a belt drive assembly 10 for heavy-duty service is shown in which a multiple ribbed power transmission belt 11 is trained around multiple grooved sheaves or pulleys 12, for example, formed of rigid metallic material.

The specific features of the belt 11 are best seen in FIGS. 2 and 3. As illustrated, the belt has a longitudinally extending continuous body 13 of an integral unitary construction. The body 13 of the belt is of flexible resilient material and preferably of flexible polymeric material such as natural or synthetic rubber or other elastomeric materials. The body 13 comprises a first portion 14 which includes a part of the tension section 15 of the belt and which in cross-section is of a generally rectangular configuration with one face thereof forming the top surface 16 of the belt. The first portion 14 or partial tension section 15 may be comprised at least in part of a plurality of layers 17 and 18 of rubberized woven fabric material such as cotton, polyester or nylon or combinations thereof.

A second portion 19 which includes the compression section 20 of the belt 11 is disposed adjacent to the first portion 14 with one face thereof defining the bottom surface 21 of the belt. The second portion 19 includes a plurality of power transmitting ribs 22 with each rib having at least one stress-resisting member 23 embedded therein at the neutral axis 24 of the belt with the member extending longitudinally of the belt and disposed across the width of the rib 22. The member 23 in any one rib 22 is aligned with the member 23 in an adjacent rib so that the distance D between the top surface 16 of the first portion 14 and a horizontal plane P—P through all of the members 23 in all of the ribs 22 is essentially equal. Each rib 22 has a cross-sectional configuration adapted to conform to a correspondingly aligned groove 25 of the pulley. The ribs 22 are preferably composed of a fiber-loaded elastomeric compound and may include one or more fabric reinforcement layers for crack resistance if desired.

It is to be understood that the use of the terms "top" and "bottom" in connection with this invention is relative depending upon the particular point of reference.

One or more grooves 26 are provided each being disposed between each adjacent rib 22 penetrating from the bottom surface 21 of the second portion 19 of the belt 11 into the compression section 20 and through the horizontal plane P—P of the stress-resisting member 23 terminating at substantially the interface of the first and second portions 14 and 19. The portion of the groove 26 disposed between the top surface 16 of the belt and the horizontal plane P—P provides a clearance gap 27 for passage of the belt 11 over the pulley 12 thereby allowing complete wedging action of each rib 22 in its corresponding pulley groove 25.

Preferably, the stress-resisting member 23 is in the form of a plurality of parallel longitudinal cords 28 with the distance $d$ between the top surface 16 of the first portion 14 of the belt and the center line of each cord 28 being substantially equal to provide a uniform cord line in each rib 22. That is to say that the distance $d$ is the same for each individual cord. The tension-resisting member is normally in the form of a single cord which may be either of a twisted fiber or filament construction referred to as cable cord or tire cord which is composed of any of the well known textile fabric materials, such as cotton, nylon, rayon, or polyester, or combinations thereof. They may also be composed of such material as steel wire or fiberglass.

Each rib 22 is preferably of a generally trapezoidal or truncated V-shaped cross-sectional configuration and each grove 26 is of a generally V-shaped cross-sectional configuration opposite to that of the ribs.

The clearance area or gaps 27 serves a very important function since in addition to providing for wedging action, it also serves as a relief area for foreign particles such as gravel or grain that otherwise would become lodged in the driving surfaces 29 of the belt and/or would lift the belt off of the sheave or pulley 12. The gap 27 may be of various shapes and configurations and in many instances is of a different cross-sectional configuration than that of the remaining portion of the groove 26. For instance, as shown in FIG. 2a, it may be in the form of a semicircle 27' or any other curvilinear configuration. Alternately, it may be of similar V-or triangular shape 27" as the remaining portion of the groove 26 as shown in FIG. 2b or square or rectangular 27''' as shown in FIG. 2c, or any other straight-sided or polygonal cross-sectional configuration. Of course, the gap 27'''' may also be of a combination of curvilinear and polygonal configurations as shown in FIG. 2d.

As shown in FIG. 4, for added flexibility, the second portion 19 of the belt 11' may include a plurality of grooves 30 therein extending transversely of the belt 11'. The grooves 30 penetrate from the bottom surface 21 of the belt into the second portion 19 and terminate short of and are spaced rom the member 23. The grooves 30 are thereby disposed in the compression section 20 of the belt.

The novel and unique structural feature of the belt of the present invention are best illustrated by reference to FIG. 5 in which the belt 31 in cross-section has an integral unitary construction including a continuous body 32 having top and bottom surfaces 33 and 34 which are equally spaced apart across the width and throughout the continuous length thereof. The body 32 includes a neutral axis section 35 extending throughout the length of the belt with a tension section 36 on one side thereof extending toward the top surface 33 of the belt and a compression section 37 on the other side thereof. A continuous part 36' of the tension section 36 extends transversely across the entire width of the belt. At least one groove 38 is provided in the compression section 37 extending from the bottom surface 34 through the compression 37 and neutral axis sections 35 into a portion of the tension section 36 to form a plurality of power transmitting ribs 39, 39'. These ribs extend longitudinally of the belt to provide a tension section 40, compression section 37, and neutral axis section 35 in each individual rib. It should be recognized that the individual tension sections 40 form a part of the overall or primary tension section 36 of the belt thereby resulting in an improved unitary construction.

The neutral axis section 35 of each rib 39, 39' includes at least one stress-resisting layer 41 therein extending longitudinally of the belt 31 and disposed across the width of each rib with the distance D, D' between the top surface 33 of the belt and a horizontal plane P—P, P'—P' through the stress-resisting layer 41, 41' in each rib 39, 39' being substantially equal from rib to rib. Preferably, the layer 41 is a plurality of parallel longitudinal members 42, 42' with the distance $d$, $d'$ between the top surface 33 of the belt 31 and each member in any one rib 39, 39' being substantially equal. It should also be noted that distances D, D' and $d$, $d'$ are also substantially equal indicating a uniform cross-sectional configuration.

FIGS. 5 and 5a through 5e present a comparison of the cross-sectional configurations of the belt structure of the present invention with those of the prior art.

Figure 5A:
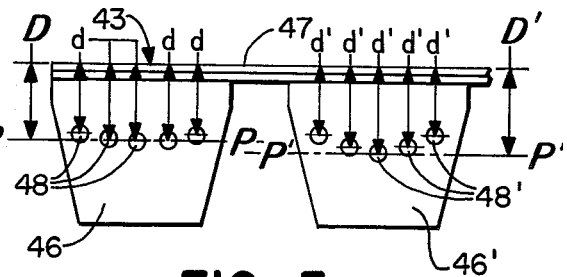
FIGS. 5a–5c are enlarged schematic views of one form of the multi-ribbed belts of the prior art to illustrate the contrast with the belt of FIG. 5.
Figure 5B:
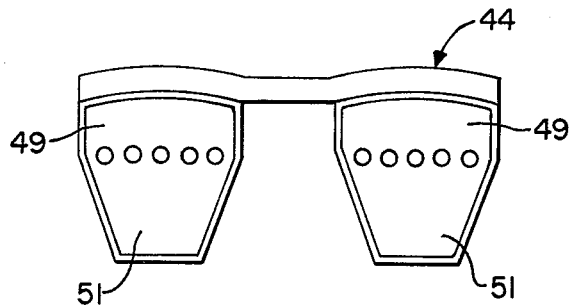
Figure 5C:
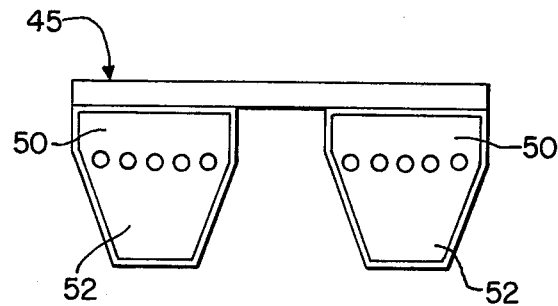

FIG. 5 illustrates in cross-section the belt 31 of the present invention showing the improved unity of construction compared to the banded-type belts 43, 44 and 45 of the prior art shown in FIGS. 5a through 5c, respectively. Molding each belt section individually as in the prior art tends to create a variance in the cord line in each rib 46, 46' as illustrated in the belt 43 of FIG. 5a. The variance is apparent by measuring the distance D, D' from the top surface 47 of the belt unit 43 to horizontal planes P—P, P'—P' through the neutral axis of each rib 46, 46' and comparing this measurement from rib to rib. Obviously, the distance D' for rib 46' is greater than distance D for rib 46. Variances within individual ribs can be shown by measuring the distance $d$, $d'$ from the top surface 47 of the belt unit 43 to the tensile center of each separate member 48, 48' of the tensile stress-resisting section of any one rib 46, 46'. This is clearly illustrated by comparing the distances $d$, $d'$ from the top surface to the cord line or neutral axis of the belt 31 of the invention shown in FIG. 5 which does not vary substantially to the banded belt 43 of the prior art shown in FIG. 5 which does vary substantially.

In the construction of the prior art belts 44 and 45 shown in FIGS. 5b and 5c, respectively, a portion of the tension section 49 and 50 of the belt does not extend transversely across the entire width of the belt as is the case with a part 36' of the tension section 36 in the belt 31 of FIG. 5. Accordingly, each belt rib 51, 52 can be expected to function with excessive individuality during the operation of the belts 44 and 45 causing an uneven wedging action in the pulley grooves and a resulting uneven driving action by the belt ribs.

Figure 5D:
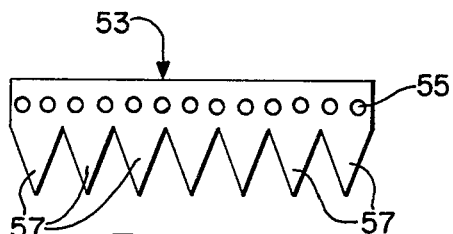
FIGS. 5d and 5e are enlarged schematic views of a second form of the multi-ribbed belts of the prior art again illustrating the contrast with the multi-ribbed belts of the present invention as shown in FIG. 5.
Figure 5E:
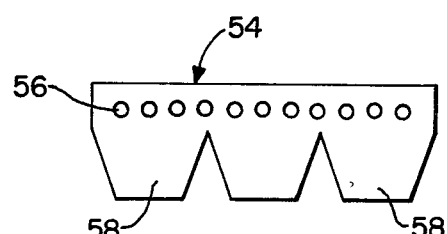

The differences of the present invention when compared to other type multi-rib belts is also apparent by comparing the cross-section of the belt 31 of the invention in FIG. 5 with the belts 53 and 54 of the prior art shown in FIGS. 5d and 5e, respectively in which the neutral axis or cord layer 55, 56 is disposed above the belt ribs 57, 58. These prior art belts 53, 54 do not allow for individual wedging action and, consequently, the belt ribs 57, 58 must be under significantly high tension during the operation of the belts.

The method of making the power transmission belt of the present invention includes the steps of forming a belt sleeve or body of substantially uniform cross-section with at least one stress-resisting layer embedded therein at a predetermined distance from one surface of the body and forming at least one groove in the opposite surface of the body extending longitudinally thereof and penetrating into the body to intersect a horizontal plane through the stress-resisting layer and terminating at a predetermined distance from the first mentioned surface to thereby separate portions of the stress-resisting layer and form a plurality of individual belt sections across the width of the sleeve or body with each section including a portion of the layer.

The grooves may be most advantageously formed by removing at least one section of the body which includes a portion of the stress-resisting layer. This can be accomplished by such techniques as grinding, milling, sawing and cutting, or any combination of these. Of course, it is to be understood that if the belt is manufactured by a method such as injection molding, the groove will be formed by omitting that portion of the belt sleeve which would otherwise be removed in a cutting or grinding operation.

Figure 6:
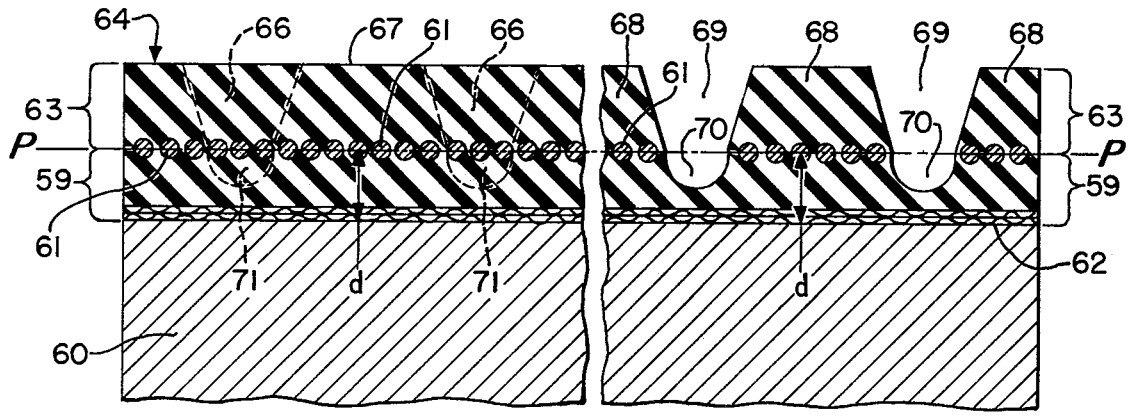
FIG. 6 is a fragmentary plan view illustrating the method of the invention in which a belt sleeve is formed on a fixed dimensioned mandrel.

The belt forming step may be best illustrated by reference to FIG. 6 and includes first applying a first portion 59 of flexible resilient material on a mandrel 60 having fixed dimensions. Then at least one stress-resisting member 61 or cord is applied over the first portion 59 so that the distance $d$ between the surface 62 of the mandrel and the approximate center of the cord is substantially equal over the entire width of the portion 59. Next, a second portion 63 of flexible resilient material is applied over the member 61 and this assembly is vulcanized into a slab of integral unitary construction having a uniform cross-section with the member 61 embedded therein as illustrated in FIG. 6. The slab defines the body of the belt or belt sleeve 64.

Of course, it will be readily apparent to those skilled in the art that the first and second portions as described above may be applied to the fixed dimension mandrel in a reverse order.

It also will be recognized that the belt body may be built on other than a fixed dimension mandrel such as on a collapsable mandrel and subsequently vulcanized in an apparatus having fixed dimensions.

After vulcanization, the groove is formed by removing a section from the sleeve or body 64 which includes at least a part of the layer of stress-resisting cords therein. For example, this may be accomplished by machining or cutting a plurality of generally V-shaped sections 66 into the outwardly facing surface 67 of the body 64 to form a plurality of cut sections as illustrated in broken lines in FIG. 6 and removing the cut sections 66 to form a plurality of ribs 68 having generally trapezoidal cross-sections with grooves 69 therebetween.

If desired, the method may also include shaping a portion 70 of the groove 69 disposed between the first portion 59 and a horizontal plane P—P through the member 61 into a different cross-sectional configuration than that of the remainder of the groove 69. This may be accomplished by machining or cutting a portion 71 of the section 66 into the desired configuration by equipment well known in the art.

In addition, if added flexibility is desired, transverse grooves may be formed in the second portion or compression section of the belt either during or after vulcanization by well known procedures for that purpose.

The following example further illustrates the objects and advantages of this invention.

EXAMPLE

In order to compare the operability, utility and general service life of the belts of the present invention with those of the other multi-ribbed constructions, several belt samples were manufactured of synthetic elastomeric material reinforced with tensin stress-resisting cords. The belt samples all were formed with three longitudinal ribs and had bodies of neoprene rubber, reinforced with polyester cords. The belt samples are labeled belt type A, B and C. Belt type A was of the type disclosed in the present invention as shown in FIG. 2 having transverse grooves as shown in FIG. 4. Belt types B and C were prior art belts of the type shown in FIGS. 5a, 5b and 5c except that they included three ribs instead of two. The belt samples after manufacture were dynamically tested as will be hereinafter described and the test results are presented below in the Table of Results.

Belt type A was of an integral unitary construction in accordance with the teachings of the present invention with the top or upper portion of the belt including two layers or plies of bias woven cotton fabric impregnated with neoprene rubber.

The group of belts labeled belt type B was made in accordance with the teachings of the prior art with individual belt sections of convential V-belt construction being tied together with a tie band consisting of polyester tire cord fabric embedded in a neoprene rubber compound with the cords extending transversely of the belt.

Belt type C was the same as belt type B except that the tie band consisted of two plies of bias woven cotton fabric of the same type used in the construction of the belts of the present invention which are labeled as belt type A.

The samples of belt types A, B and C were dynamically tested according to the following procedure. Each belt sample was mounted on a V-belt test dynamometer having a three-pulley arrangement consisting of a drive, idler and driven pulley. The drive, idler and driven pulley all had 6 inch pitch diameters. The drive pulley was operated at 2350 rpm. The horsepower loads at the driven pulley were 83 and 90 hp as noted in the Table of Results. The tight side tension was 1005 pounds at 90 hp and 927 pounds for the 83 hp test. The belts were tested to failure except as noted and the lapsed time of the test of each belt sample to failure is shown in the Table of Results.

TABLE OF RESULTS

| Belt Type | Time to Failure (Hours) | |
|---|---|---|
| | 83 HP Test | 90 HP Test |
| A | 275, 467(*), 855(*), 1054(*) | 121(*), 138, 119 |
| | Average = 663 | 242 Average = 155 |
| B | 26, 22, 11, 76, 22 | 6, 4, 4, 27, 23 |
| | Average = 31.4 | Average = 12.8 |
| C | 69, 91 | |
| | Average = 80 | |

(*)Belt sample removed from test before failure

This above data indicates that the samples of belt type A of the present invention exhibit a far superior resistance to failure under dynamic tests than do the belts B and C constructed in accordance with the teaching of the prior art. Belt samples A of this invention were superior to samples B constructed with a convential tie band consisting of transverse tire cord and were also superior to samples C in which a bias woven fabric was used as a tie band material. It is significant to note that the tie band used in the type C belts was of an identical material and structure to that used to form the top portion of the type A belts thereby providing a direct comparison between the constructions of belt A of the present invention versus that of belt C of the prior art. The principle difference between the two constructions being that a part of the tension section of the samples of the type A belts disposed below the fabric layers extend across the entire width of the belt to form a unitary cross-sectional configuration.

While certain representative embodiments and details have been shown for the purpose of illustrating the invention, it will be apparent to those skilled in the art that various changes and modifications may be made therein without departing from the spirit or scope of the invention.

What is claimed is:

1. A belt of integral unitary construction which will transmit power at low tensions comprising a continuous singular body having top and bottom surfaces which are equally spaced apart across the width and throughout the continuous length thereof, said body comprising a neutral axis section extending throughout the length of said belt with a tension section on one side thereof extending toward the top surface of said belt and a compression section on the other side thereof, a continuous part of said tension section extending transversely across the entire width of the belt, and at least one groove in said compression section extending from the bottom surface through said compression and neutral axis sections into a portion of said tension section to form a plurality of power transmitting ribs extending longitudinally of the belt to provide a tension section, compression section and neutral axis in each individual rib, said continuous part of the tension section being a continuum of each tension section of each individual rib and being non-separately attached to each rib.

2. The belt as claimed in claim 1, wherein the neutral axis section of each said rib includes at least one stress-resisting layer therein extending longitudinally of the belt and disposed across the width of the rib with the distance between the top surface of the belt and a horizontal plane through said layer in each rib being substantially equal from rib to rib.

3. The belt as claimed in claim 2, wherein said layer is comprised of a plurality of parallel longitudinal members with the distance between the top surface of the belt and each member in any one rib being substantially equal.

4. The belt as claimed in claim 1, wherein each said rib is of a generally truncated V-shaped cross-sectional configuration and each groove is of a V-shaped configuration opposite to that of said ribs.

5. The belt as claimed in claim 1, wherein the portion of the groove disposed between the top surface of the belt and a horizontal plane through said neutral axis is of a different cross-sectional configuration than that of the remaining portion of said groove.

6. The belt as claimed in claim 1, wherein each said compression section of each rib includes a plurality of grooves therein extending transversely of the belt to provide added flexibility.

7. The belt as claimed in claim 1, wherein at least a portion of said tension section of the belt is comprised of at least one layer of rubberized fabric material.

8. A multi-ribbed transmission belt for use with multi-grooved pulleys, said belt having a longitudinally extending continuous singular body of an integral unitary construction comprising:
  A. a first portion in cross-section being of generally rectangular configuration with one face thereof forming the top surface of the belt;
  B. a second portion adjacent to said first portion and being a non-separately attached continuation thereof, said second portion having one face defining the bottom surface of the belt and including: a plurality of power-transmitting ribs with each rib having at least one stress-resisting member embedded therein with said member extending longitudinally of the belt and disposed across the width of the rib, the member in one said rib being aligned with the member in an adjacent rib so that the distance between the top surface of said first portion and a horizontal plane through all of the members in all of the ribs is substantially equal, each rib having a cross-sectional configuration adapted to conform to a groove of the pulley; and a groove provided between each adjacent rib penetrating from the bottom surface of said second portion through the horizontal plane of said stress-resisting members and terminating at substantially the interface of said first and second portion to provide a clearance gap for passage of the belt over the pulley thereby allowing a complete wedging action of each said rib in its corresponding pulley groove.

9. The belt as claimed in claim 8, wherein said member is a plurality of parallel longitudinal cords with the distance between the top surface of said first portion and each cord being substantially equal to provide a uniform cord line in each said rib.

10. The belt as claimed in claim 8, wherein each said rib is of a generally trapezoidal cross-sectional configuration and each said groove is of a generally V-shaped cross-sectional configuration.

11. The belt as claimed in claim 8, wherein said clearance gap is of a different cross-sectional configuration than the remaining portion of said groove.

12. The belt as claimed in claim 11, wherein said gap is of a generally curvilinear cross-sectional configuration.

13. The belt as claimed in claim 11, wherein said gap is of a generally polygonal cross-sectional configuration.

14. The belt as claimed in claim 8, wherein said first portion is comprised of one or more layers of rubberized fabric.

15. The belt as claimed in claim 8, wherein said second portion includes a plurality of grooves therein extending generally transversely of the belt, said grooves penetrating from the bottom surface of the belt into said second portion and terminating short of and being spaced from said member.

16. In a belt drive assembly including the combination of a belt of flexible resilient material having a plurality of ribs of generally trapezoidal cross-section with a plurality of grooves therebetween and a pair of grooved pulleys around which the belt is applied with each rib of said belt engaging a groove of said pulleys, said belt comprising a continuous singular body having two opposite surfaces which are equally spaced apart throughout the continuous length thereof, said body comprising a primary tension section adjacent to one surface of the body having a continuing part thereof extending transversely across the entire width of the belt and a plurality of parallel power transmitting V-ribs extending longitudinally of the belt and downwardly from said continuing part of the primary tension section and constituting a non-separately attached continuum thereof, the grooves between the ribs terminating at said continuing part of the primary tension section, each said rib including an individual tension section, compression section and neutral axis between the tension and compression sections, each said neutral axis including at least one stress-resisting layer therein and said ribs being spaced to engage the grooves of the pulley in driving relation, the configuration of the belt grooves between the primary tension section and a horizontal plane through said stress-resisting layer providing a clearance area for passage of the belt over the ribs of the pulley to allow individual wedging action of each rib in a corresponding pulley groove.

* * * * *